United States Patent
Sanderford

(10) Patent No.: US 11,856,925 B1
(45) Date of Patent: Jan. 2, 2024

(54) BROADCAST FEEDER

(71) Applicant: James Scott Sanderford, Cheyenne, OK (US)

(72) Inventor: James Scott Sanderford, Cheyenne, OK (US)

( * ) Notice: Subject to any disclaimer, the term of this patent is extended or adjusted under 35 U.S.C. 154(b) by 671 days.

(21) Appl. No.: 16/210,166

(22) Filed: Dec. 5, 2018

Related U.S. Application Data

(60) Provisional application No. 62/599,505, filed on Dec. 15, 2017, provisional application No. 62/609,117, filed on Dec. 21, 2017.

(51) Int. Cl.
*A01K 5/02* (2006.01)

(52) U.S. Cl.
CPC .................... *A01K 5/0225* (2013.01)

(58) Field of Classification Search
CPC .. A01K 39/014; A01K 39/225; A01K 5/0225; A01K 5/0233; A01K 5/0275; A01K 5/0291
USPC ........................................... 119/51.01, 57.91
See application file for complete search history.

(56) References Cited

U.S. PATENT DOCUMENTS

| | | | | |
|---|---|---|---|---|
| 2,598,977 | A * | 6/1952 | Dale .................... | A01K 39/014 119/51.11 |
| 3,638,617 | A * | 2/1972 | White .................. | A01K 39/014 119/51.03 |
| 3,717,127 | A | 2/1973 | Porterfield | |
| 4,823,738 | A * | 4/1989 | Gold .................... | A01K 5/0114 119/51.01 |
| 5,237,803 | A | 8/1993 | Domingue, Jr. | |
| 6,082,300 | A * | 7/2000 | Futch ..................... | A01K 5/02 119/51.11 |
| 6,116,471 | A * | 9/2000 | Miller .................. | A01K 5/0225 222/199 |
| 7,222,583 | B2 | 5/2007 | Foster et al. | |
| 7,798,098 | B1 * | 9/2010 | Patterson ............. | A01K 5/0225 119/51.11 |

(Continued)

OTHER PUBLICATIONS

Ebsco Industries, Inc., "Instructions for Moultrie Programmable Digital Timer Quick-Lock Kits," product Instruction sheet, Dec. 3, 2015, 2 pages, Ebsco Industries, Inc., Birmingham, Alabama, USA.

(Continued)

*Primary Examiner* — Peter M Poon
*Assistant Examiner* — Danielle A Clerkley
(74) *Attorney, Agent, or Firm* — Mary M. Lee

(57) ABSTRACT

A feeder assembly for dispensing feed to wildlife and other animals. The assembly includes a hopper, such as a conventional gravity-feed hopper. The assembly includes a broadcast feeder that sprays feed from a spinning tray driven by a motor. The feeder housing includes domed plates above and below the tray to direct the spray of feed peripherally and prevent varmints from operating the tray manually. The feeder housing may include an attachment plate to attach the feeder to the inside or outside of the bottom of the hopper. The housing may include a collar that is threadedly connectable to a downwardly extending neck on the attachment plate so the housing can be easily connected to and disconnected from the hopper. A chute control plank in the neck of the housing opens and closes the chute to allow removal of the feeder from the hopper without spilling feed.

35 Claims, 6 Drawing Sheets

(56) References Cited

U.S. PATENT DOCUMENTS

| | | | |
|---|---|---|---|
| 8,015,945 B1 | 9/2011 | Traywick et al. | |
| 8,016,169 B2 | 9/2011 | Blandini et al. | |
| 8,631,764 B2 * | 1/2014 | Quiring | A01K 5/0225 |
| | | | 119/57.91 |
| 8,683,948 B2 * | 4/2014 | Gerke | A01K 5/0225 |
| | | | 119/57.1 |
| 10,810,527 B2 * | 10/2020 | Lauve, IV | G06Q 10/06314 |
| 2009/0199773 A1 * | 8/2009 | Jurk | A01K 5/0225 |
| | | | 119/57.91 |
| 2010/0107983 A1 * | 5/2010 | Gates | A01K 5/0225 |
| | | | 119/53 |
| 2013/0186342 A1 * | 7/2013 | Salinas | A01K 5/02 |
| | | | 119/51.11 |
| 2014/0060439 A1 * | 3/2014 | Browning | A01K 39/014 |
| | | | 119/51.11 |
| 2014/0174368 A1 * | 6/2014 | Salinas | A01K 5/0291 |
| | | | 119/51.11 |
| 2015/0272079 A1 * | 10/2015 | Evans | A01K 5/0225 |
| | | | 119/51.01 |
| 2016/0095291 A1 * | 4/2016 | Gates | A01K 5/01 |
| | | | 119/52.1 |
| 2017/0055492 A1 * | 3/2017 | Lowenthal | A01K 5/0225 |
| 2019/0090473 A1 * | 3/2019 | West | A01M 31/008 |

OTHER PUBLICATIONS

Ebsco Industries, Inc., "Instructions for Pro Hunter Feeder Kit," product instruction sheet, 2013, 2 pages, Ebsco Industries, Inc., Birmingham, Alabama, USA.

* cited by examiner

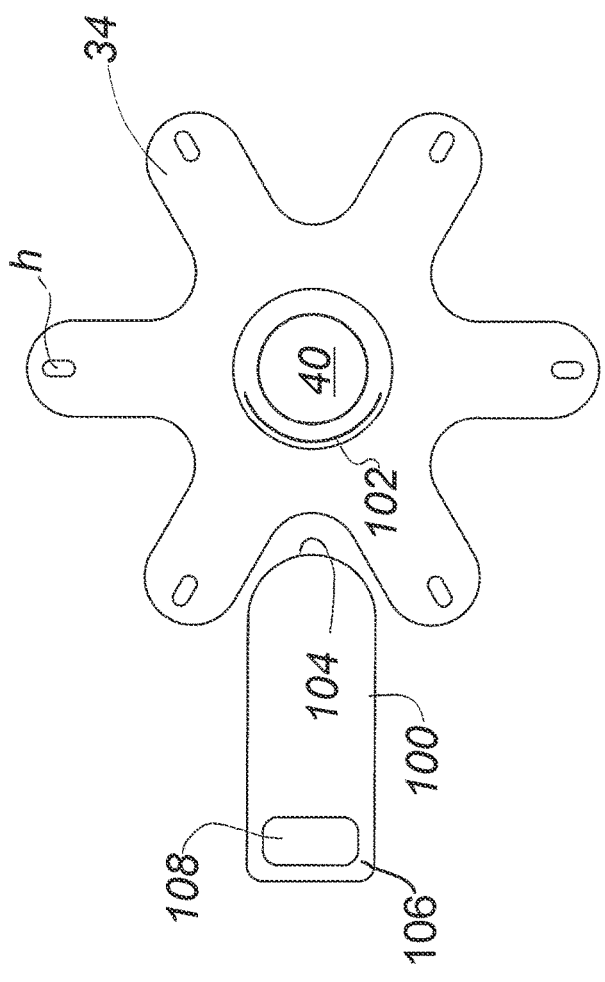
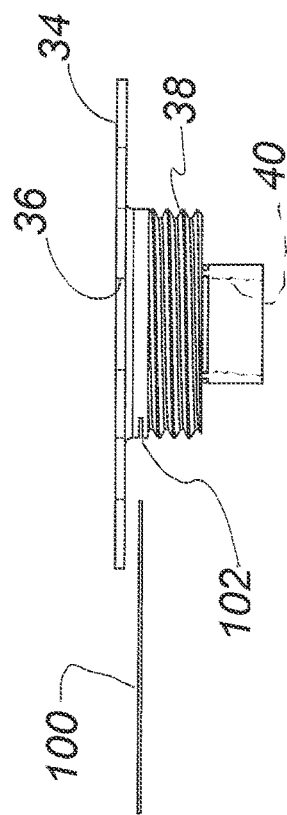
FIG. 7
FIG. 8
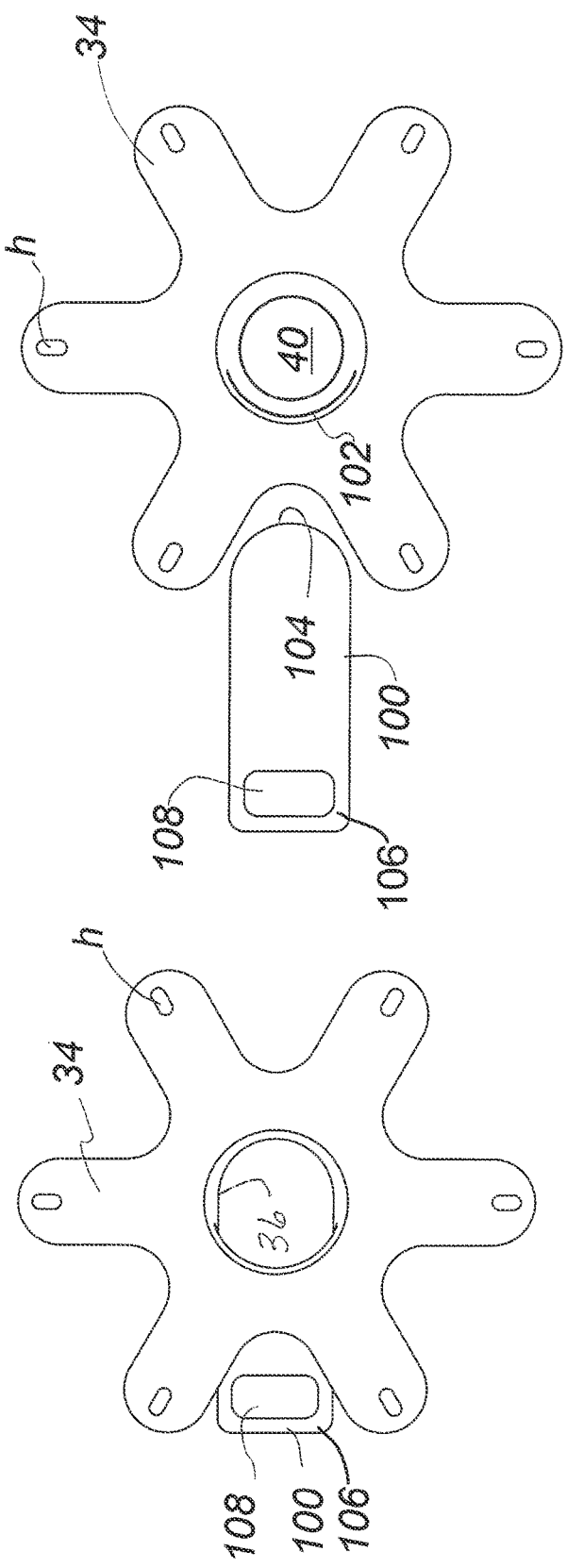
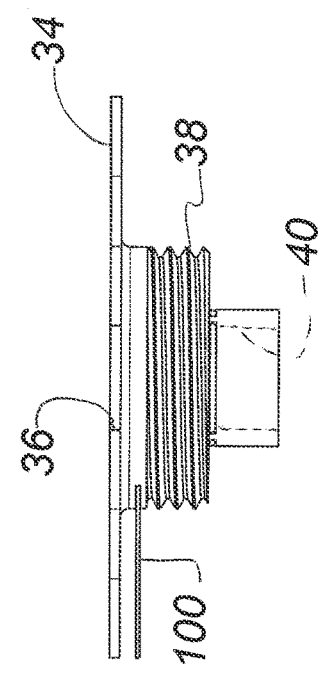
FIG. 9
FIG. 10

BROADCAST FEEDER

CROSS-REFERENCE TO RELATED APPLICATIONS

This application claims the benefit of U.S. provisional application No. 62/599,505 entitled "Broadcast Feeder," filed Dec. 15, 2017, and U.S. provisional application No. 62/609,117, entitled "Broadcast Feeder," filed Dec. 21, 2017, and the contents of these prior applications are incorporated herein by reference.

FIELD OF THE INVENTION

The present invention relates to devices for dispensing feed to animals and, more particularly but without limitation, to broadcast feeders for wildlife.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate a preferred embodiment of the invention and are not to be construed as limiting the scope of the invention.

FIG. 7 is a plan view of the adapter of the feeder shown in FIG. 2 with the slide plank closed FIG. 8 is a side elevational view of the adapter of the feeder shown in FIG. 2 with the slide plank closed.

FIG. 9 is a plan view of the adapter of the feeder shown in FIG. 2 with the slide plank open.

FIG. 10 is a side elevational view of the adapter of the feeder shown in FIG. 2 with the slide plank open.

DETAILED DESCRIPTION OF THE PREFERRED EMBODIMENT(S)

Landowners with expansive property and who enjoy hunting deer and other game animals on their property sometimes use broadcast feeders to dispense feed to the indigenous animals to attract and retain the animals, to encourage antler growth, and to increase the size of the animals. Broadcast feeders provide supplemental nutrition to the game animals but often are susceptible to consumption by varmints and other undesirable critters, such as squirrels. Feed consumed by such varmints increases the cost of the feed and the inconvenience of having to refill the hopper more frequently. The present invention provides an improved broadcast feeder that efficiently dispenses feed while also effectively preventing access to varmints. Additionally, the design of the inventive feeder provides increased versatility in how the unit is attached to the feed hopper. These and other features and desirable advantages will be apparent from the following description of a preferred embodiment with reference to the accompanying drawings.

Figure 1:
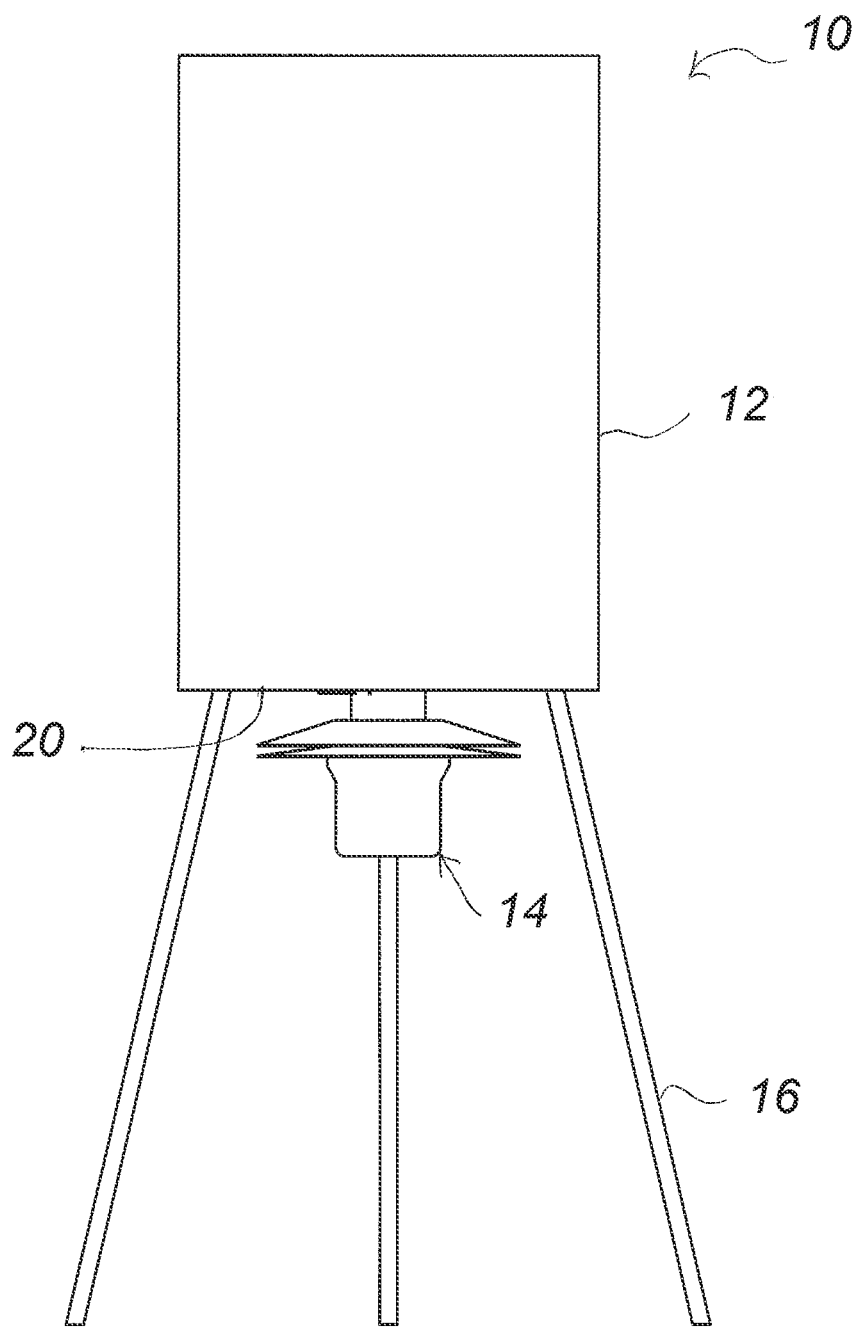
FIG. 1 is a side elevational view of a broadcast feeder made in accordance with an embodiment of the present invention and shown attached to the bottom of a feed hopper.

Turning now to the drawings in general and to FIG. 1 in particular, there is shown therein a feeder assembly constructed in accordance with an embodiment of the present invention and designated generally by the reference numeral 10. The feeder assembly 10 comprises a hopper 12 and a broadcast feeder 14. The hopper 12 may comprise a conventional gravity-feed style hopper on a trip-pod stand 16. The feeder 14 may be attached to the bottom 20 of the hopper 12. The feeder 14 is designed to dispense granules of feed 12 flowing through the central opening 18 (FIG. 6) in the bottom 20 of the hopper 12. As used herein, "granules" means any dry (non-liquid) type animal feed regardless of the size of the granules, which may be smaller particulates or larger pellets in form. "Feed" as used herein means any consumable substance suitable for animals, including compositions used as a primary diet and various nutritional supplements. "Animal" as used herein means any domesticated or non-domesticated animal, including but not limited to wildlife, such as deer.

Referring now to FIGS. 2-6, one embodiment of the inventive feeder 14 will be described. The feeder 14 includes a housing 24 that may varying is size and configuration. In the embodiment shown, the housing 24 has three sections, an adapter section 26 for attaching the housing 24 to the hopper 12, a dispenser section 28 for enclosing the dispenser that expels the feed granules, and a motor section 30 for housing the motor assembly that drives the dispenser.

The adapter section 26 may comprise an attachment plate 34 attachable to the inside surface 20a or the outside surface 20b of the bottom 20 (FIG. 6) of the feed hopper 12. The attachment plate 34 may be generally planar with one or more holes "h" for securing the plate to the bottom 20 of the hopper. A feed opening 36 may be formed in the plate 34. The feed opening 36 should be sized and positioned to allow feed granules to pass through the central opening 18 in the bottom 20 of the hopper.

Figure 6:
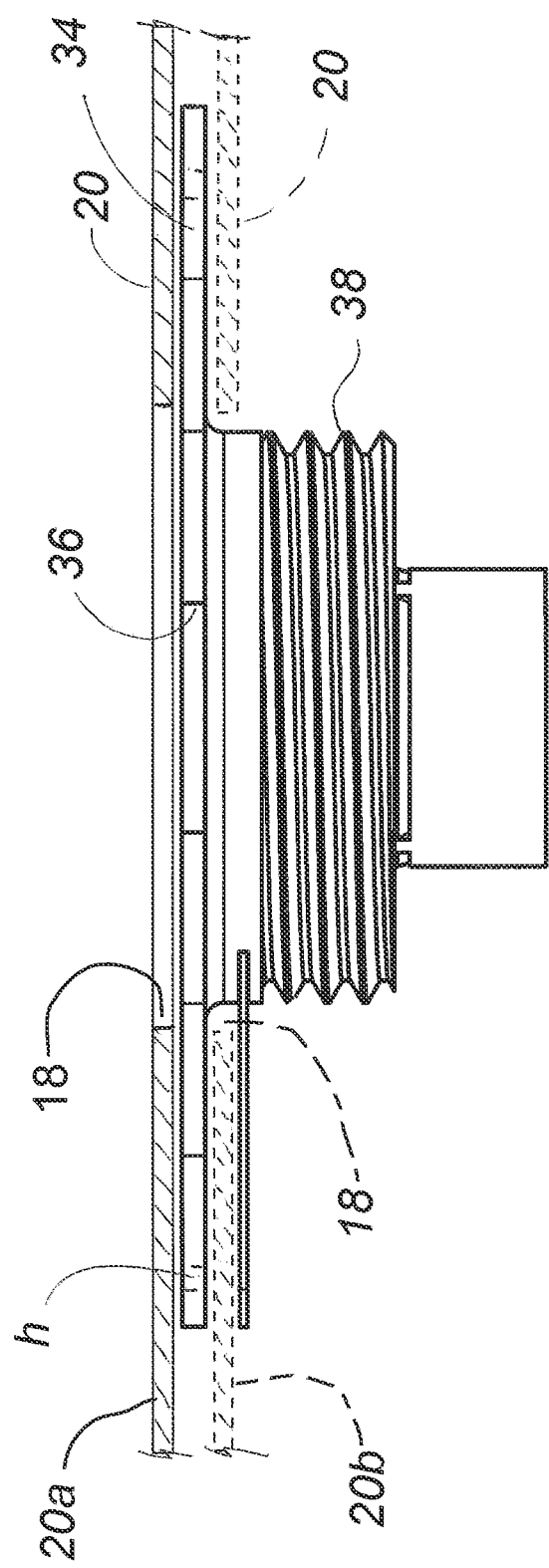
FIG. 6 is a side view of the adapter illustrating alternate placement of the attachment plate on the inside and outside of the bottom of the feed hopper.

Depending from the plate 34 is a cylindrical neck 38 that defines a chute 40 configured to receive feed from the feed hopper 12 through the feed opening 36. While the funnel shaped chute 40 is shown in this embodiment, the invention is not so limited. Now it will be appreciated that the planar shape and dimensions of the plate 34 may be selected so that the plate can be attached alternately to the outside (solid lines) or the inside (broken lines) of the bottom 20 of the feed hopper 12 as illustrated in FIG. 6.

The adapter section 26 may also include a collar 42 sized to removably receive the neck 38. In the embodiment shown, the collar 42 has internal threads and the neck 38 has external threads. However, other means for connecting the collar 42 to the neck 38 may be employed alternately.

Figure 4:
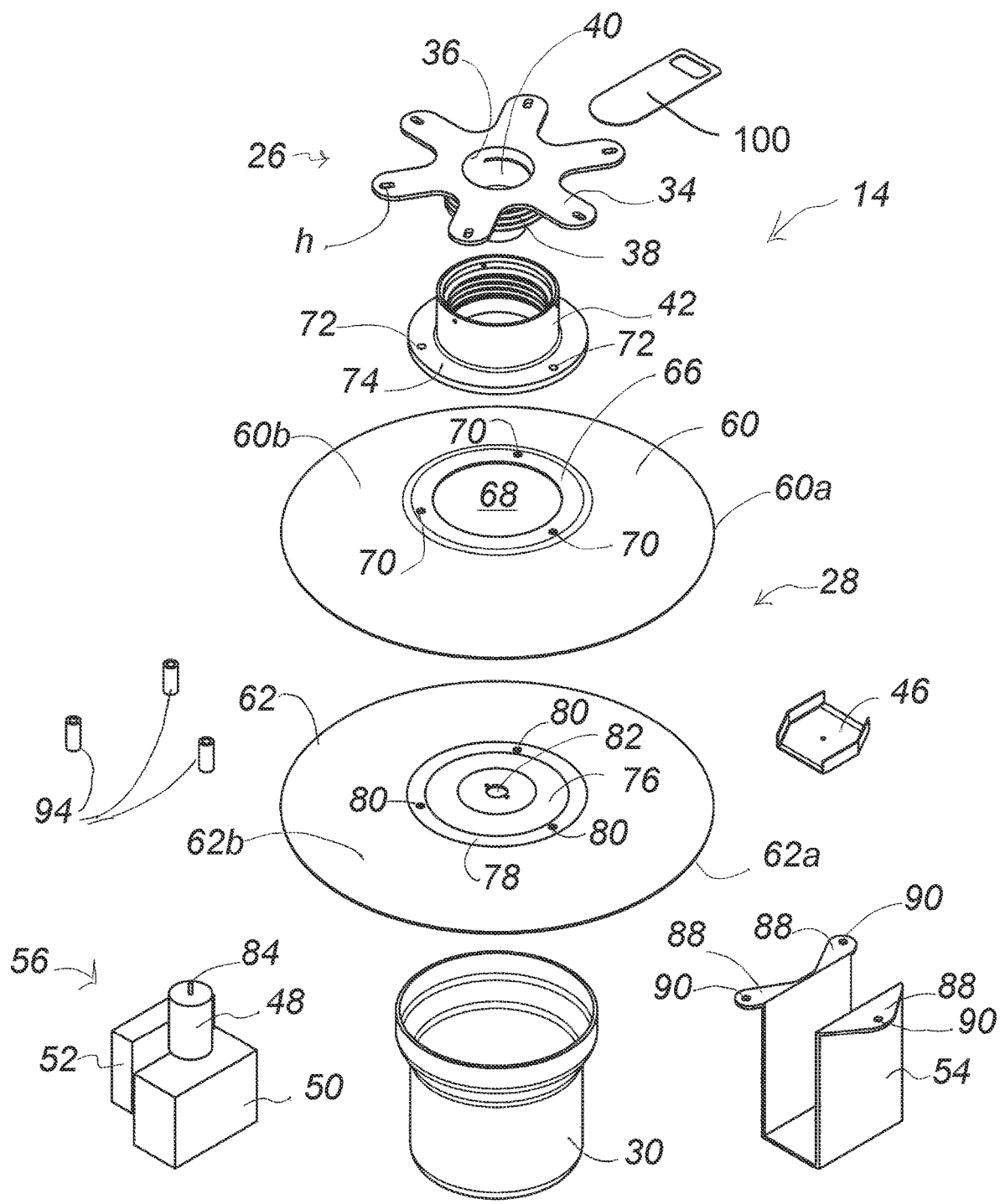
FIG. 4 is an exploded perspective view of the feeder shown in FIG. 2.
Figure 5:
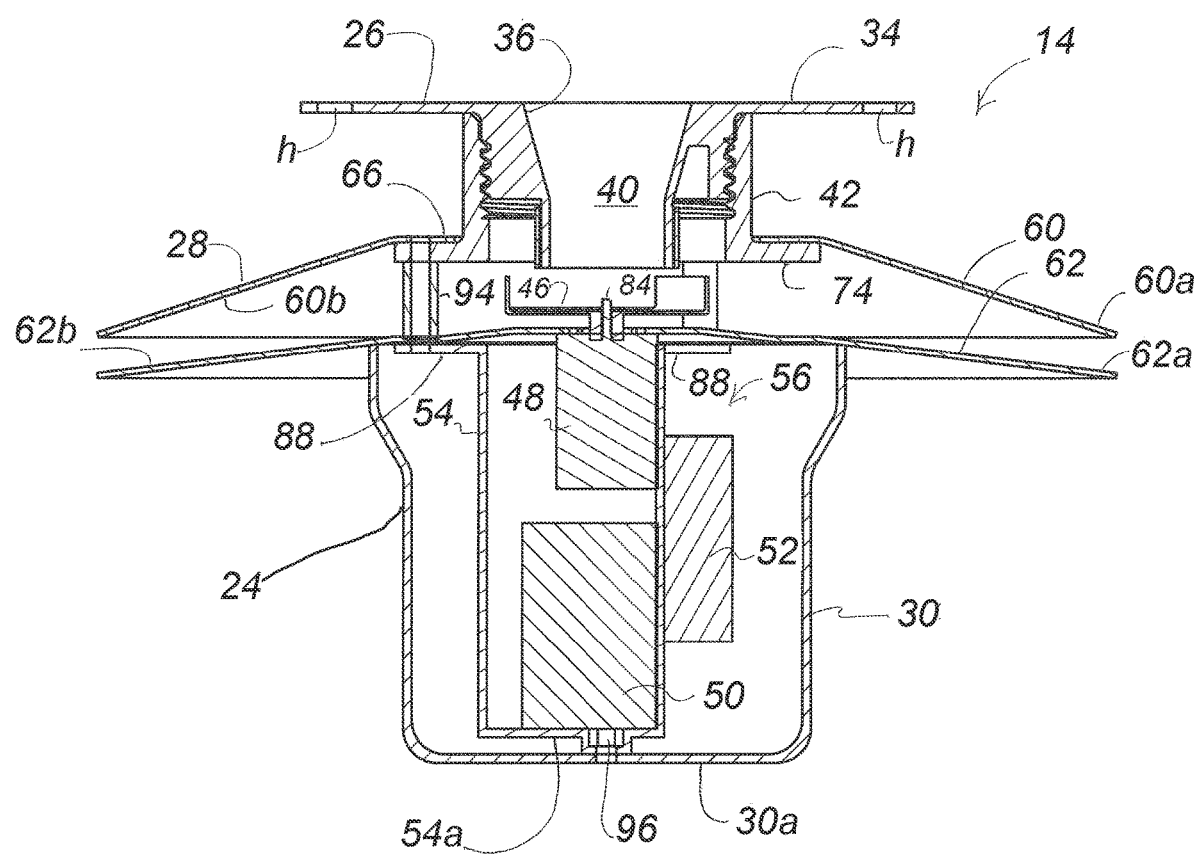
FIG. 5 is a longitudinal sectional view of the feeder shown in FIG. 2.

With continuing reference to FIGS. 2-6, the feeder 14 comprises a dispenser rotatably supported in the housing 24 and positioned to receive feed from the chute 40 and to throw the feed radially by centrifugal force as the dispenser is rotated. In the embodiment shown, the dispenser takes the form of a small tray 46, as seen in FIGS. 4 and 5, though the size and configuration of the dispenser may vary. The tray 46 may be disposed a short distance from the bottom of the chute 40 so that after the tray stops spinning and the feed granules collect on top of the tray, flow of the feed from the hopper 12 will stop until the tray begins to spin again.

As seen in FIGS. 4 and 5, a motor 48 may be provided to rotate the tray 46. In one embodiment, the motor is an electric motor and may be powered by a battery 50 or other power supply. The battery 50 may be rechargeable and a solar panel or other collector (not shown) may be included. Additionally, as is known in the art, the operation of the motor 48 may be automated using a simple control unit 52 so that feed can be dispensed according to a preselected schedule. The motor 48, battery 50, and control unit 52 may be supported on a sling 54 or other suitable frame, which together form a motor assembly 56 contained in the motor enclosure 30.

As indicated above, flow of feed granules from hopper 12 will stop once the tray 46 stops spinning. However, other animals, such as cattle, squirrels and birds, quickly learn to obtain feed by manually rotating the tray 46. The consumption of the feed by these animals increases the cost of feed and the frequency with which the hopper has to be refilled. To prevent small varmints from robbing the feeder, the dispenser section 28 may include a guard.

Figure 2:
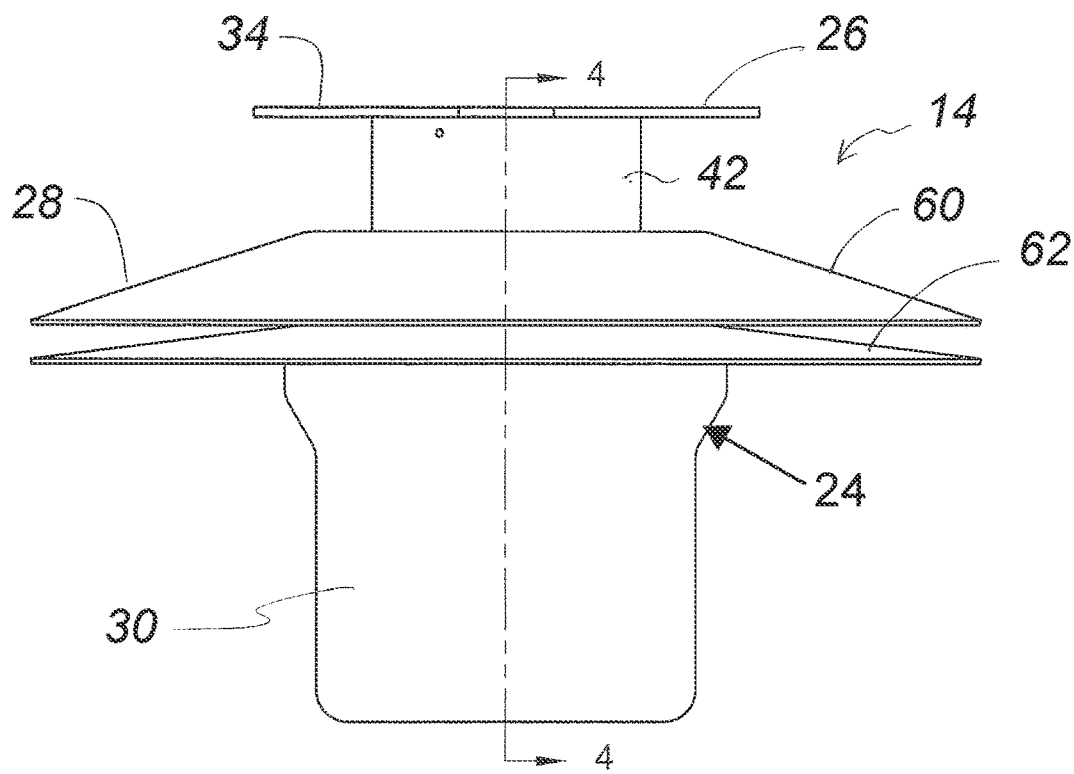
FIG. 2 is a side elevational view of the feeder shown in FIG. 1.
Figure 3:
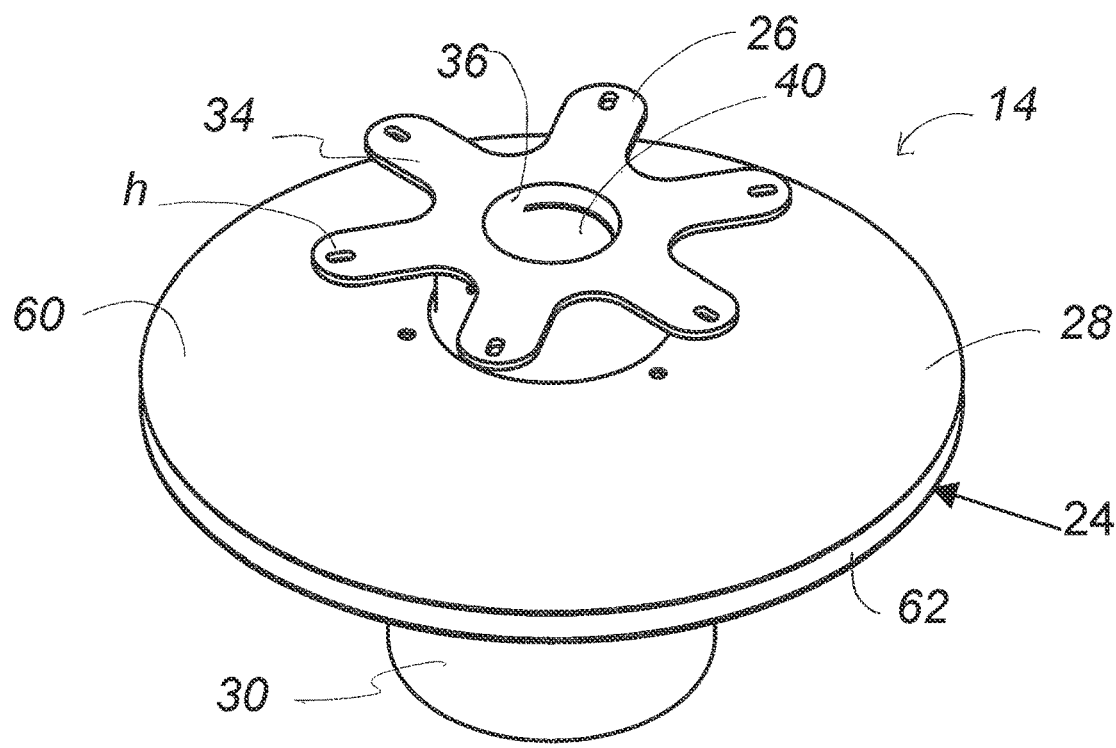
FIG. 3 is a top perspective view of the feeder shown in FIG. 2.

One preferred guard also serves to direct the feed as it is thrown from the tray 46. To that end, the dispenser section 28 comprises an upper guide plate 60 and a lower guide plate 62. The upper guide plate 60 is positioned above the dispenser tray 46, and the lower guide plate 62 is positioned immediately below the dispenser. As best seen in FIGS. 2 and 5, each of the upper and lower guide plates 60 and 62 is domed forming a downwardly (as viewed in FIGS. 1 and 5) sloping surface 60b and 62b, and each plate extends a distance beyond the tray 46.

Each of the upper and lower guide plates 60 and 62 defines an outer circumferential edge 60a and 62a, respectively, and these edges are spaced from each other a distance selected to prevent selected varmints from reaching the dispenser. That is, the size and relative positions of the guide plates 60 and 62 may vary depending on the type of invading varmint that is a problem in the surrounding area. The lower guide plate 62 preferably is imperforate to the feed granules, that is, it may be made of solid metal or composite material. However, if the plate 62 is formed of mesh or porous material, there should be no openings in the in the plate that are large enough to allow the feed granules to pass through or to permit unwanted animals from accessing the tray 46.

Referring still to FIG. 5, in a most preferred practice of this invention, the upper guide plate 60 has a steeper slope (higher dome) than the bottom guide plate 62. The downward slope of the bottom plate 62 prevents feed pellets from accumulating on the plate. The more steeply domed upper plate 60 may be shaped so that the circumferential edge 60a is at or below the bottom of the tray 46. In this way, the upper plate 60 forms a protective canopy for the feed accumulated on the tray 46. This reduces the likelihood that rain water will moisten the feed as well as the chance that gusts of wind will spin the tray resulting in unscheduled release of feed.

Although the details of construction may vary, in the embodiment shown the upper guide plate 60 has an inner rim 66 forming a feeder opening 68. The rim 66 may have holes 70 that align with holes 72 in an annular flange 74 on the bottom of the collar 42, as shown best in FIG. 4.

The lower plate 62 may have a flattened hub section 76 circumscribed by an annular rim 78 with holes 80 that align with the holes 70 in the rim 66 of the upper plate 60 for a purpose yet to be described. A small opening 82 may be formed in the center of the hub 76 for the motor shaft 84 (FIG. 5). The sling 54 of the motor assembly 56 may have horizontally extending tabs 88 with holes 90 that align with the holes 80 in the lower plate 62 and the holes 70 in the upper plate 60.

Spacer sleeves 94 (FIGS. 4&5) positioned between the guide plates 60 and 62 receive long bolts (not shown) to secure the plates 60 and 62 and the motor sling 54 together. The bottom 30a of the motor enclosure 30 may be secured to the bottom 54a of the motor sling 54 using a threaded stub, or bolt, or other suitable connection 96 (FIG. 5). Thus, the three long bolts secure the collar 42, the upper and lower guide plates 60 and 62 with the spacer sleeves 94 therebetween, to the motor sling 54 with the attached motor enclosure 30.

As described previously, the feeder 14 of the present invention ideally includes a quick disconnect feature so that the feeder can be easily disconnected and reconnected to the feed hopper 12. That is, the dispenser and motor sections 28 and 30 of the housing 24 can be separated from the adapter section 26 by simply unscrewing the collar 42 from the neck 38. However, if some feed remains in the hopper, disconnecting the feeder 14 can result in some of the feed spilling out onto the ground or surrounding area. To prevent this wasteful and messy loss of feed the present invention advantageously may include a chute control member.

Referring still to FIG. 4 and now also to FIGS. 7-10 one embodiment of the chute control member will be explained. As shown, the chute control member 100 may be movably mounted in the neck 38 of the attachment plate 34 for movement between an open position (FIGS. 9&10) in which the chute 40 is open to allow feed to pass therethrough and a closed position (FIGS. 7&8) in which the chute is closed to prevent passage of feed therethrough.

Preferably, the chute control member is planar, such as a disk or plate that may be positioned immediately below the bottom surface of the plate 34. In the embodiment shown the chute control member is a plank-shaped member 100. The neck 38 of the attachment plate 34 may include a slot 102 (FIG. 10) sized to receive the plank 100. In this way, the plank 100 may slide radially in and out of the slot 102. Where the inner diameter of the chute 40 is circular, the inner end 104 of the plank may be curved (FIG. 9) so that in the closed position, the inner end abuts and conforms closely to the inner surface of the chute. The outer end 106 of the plank 100 may include a hole or other structure forming a handle 108 (FIGS. 7&9) for moving the plank in and out of the neck 38.

For the purpose of this description, the words left, right, front, rear, up, down, top, bottom, upper, lower, upward, downward, inside, and outside may be used to describe the various parts and directions of the invention as depicted in FIG. 1.

Now it will be apparent that the present invention provides a broadcast feeder with many advantageous features. The structure is simplified making the feeder economical to manufacture and easy to use. Feed loss is reduced by a chute control mechanism. Access to the spinner tray by squirrels and other unwanted animals is prevented by the closely fitted domed guide plates. The adapter plate makes the feeder usable with virtually any feed hopper and can be attached to the inside or outside of the hopper.

The embodiments shown and described above are exemplary. Many details are often found in the art and, therefore, many such details are neither shown nor described herein. It is not claimed that all of the details, parts, elements, or steps described and shown herein are newly invented. Changes may be made in the details, especially in matters of shape, size, and arrangement of the parts, within the principles of the invention to the full extent indicated by the broad meaning of the terms in the attached claims. The description and drawings of the specific embodiments herein do not point out what an infringement of this patent would be, but rather provide non-limiting examples of how to use and make the invention. Likewise, the abstract is neither intended to define the invention, which is measured by the claims, nor is it intended to be limiting as to the scope of the invention in any way. The limits of the invention and the bounds of the patent protection are measured by and defined in the following claims.

What is claimed is:

1. A broadcast feeder for dispensing granules of feed from a feed hopper, the feed hopper having a planar bottom having a bottom surface with a central opening therethrough, the feeder comprising:
    a planar attachment plate having an upper surface with a feed opening and being removably attachable to the bottom surface of the bottom of the feed hopper in face-to-face engagement therewith and so that the feed opening is alignable with the central opening in the bottom of the hopper;
    a dispenser removably attachable to the attachment plate and rotatably supported to throw feed radially by centrifugal force when the dispenser rotates;
    a chute configured to receive feed from the feed hopper and to direct feed to the dispenser;
    a neck depending from the attachment plate and forming the chute;
    a collar attachable to the dispenser and removably connectable to the neck;
    a chute control member mounted relative to the attachment plate for movement between an open position and a closed position, wherein in the open position feed is allowed to pass through the central opening in the hopper bottom, and wherein in the closed position, passage of feed through the central opening in the bottom of the hopper is blocked; and
    a motor operatively connected to the dispenser to rotate the dispenser.

2. The broadcast feeder of claim 1 wherein the chute control member is planar.

3. The broadcast feeder of claim 2 further comprising a neck depending from the attachment plate and forming the chute and wherein the neck defines a slot and wherein the chute control member is configured for movement through the slot.

4. The broadcast feeder of claim 3 wherein the chute control member comprises an elongate plank that is movable radially in and out of the slot.

5. The broadcast feeder of claim 1 wherein the collar and neck are cylindrical and are threadedly connectable.

6. The broadcast feeder of claim 1 wherein the motor is part of a motor assembly comprising a motor and a power supply and a motor enclosure configured to enclose the motor and the power supply.

7. The broadcast feeder of claim 6 wherein the motor assembly further comprises a control unit.

8. The broadcast feeder of claim 1 wherein the dispenser comprises a tray.

9. The broadcast feeder of claim 1 further comprising an upper guide plate above the dispenser and a lower guide plate below the dispenser, wherein each of the upper and lower guide plates is domed and extends a distance beyond the dispenser forming a downwardly sloping surface, wherein each of the upper and lower guide plates defines an outer circumferential edge, and wherein the outer circumferential edges of the upper and lower guide plates are spaced from each other a distance selected to prevent selected varmints from reaching the dispenser.

10. The broadcast feeder of claim 9 wherein the lower guide plate is imperforate to the feed granules.

11. The broadcast feeder of claim 9 wherein the slope of the upper guide plate is greater than the slope of the lower guide plate.

12. The broadcast feeder of claim 9 wherein the dispenser is configured so that the only access to the feed in the dispenser is between the outer circumferential edges of the upper and lower guide plates.

13. A feeder assembly comprising the broadcast feeder of claim 1 and a feed hopper.

14. A broadcast feeder for dispensing granules of feed from a feed hopper, the feed hopper having a bottom with an inside surface and outside surface and a central opening, the feeder comprising:
    a housing defining a chute configured to receive feed from the feed hopper and further comprising an attachment plate with a feed opening and configured for attachment alternately to the inside surface or the outside surface of the bottom of the feed hopper so that the feed opening is alignable with the central opening in the bottom of the hopper;
    a dispenser rotatably supported in the housing and positioned to receive feed from the chute and to throw feed radially by centrifugal force when the dispenser rotates; and
    a motor supported in the housing and operatively connected to the dispenser to rotate the dispenser.

15. The broadcast feeder of claim 14 wherein the housing further comprises a collar sized to removably receive the chute.

16. The broadcast feeder of claim 15 wherein the collar and chute are cylindrical and are threadedly connectable.

17. The broadcast feeder of claim 14 wherein the motor is part of a motor assembly comprising a motor and a power supply and wherein the housing further comprises a motor enclosure configured to enclose the motor assembly.

18. The broadcast feeder of claim 17 wherein the motor assembly further comprises a control unit.

19. The broadcast feeder of claim 14 wherein the dispenser comprises a tray.

20. The broadcast feeder of claim 14 wherein the housing further comprises an upper guide plate above the dispenser and a lower guide plate below the dispenser, wherein each of the upper and lower guide plates are domed and extend a distance beyond the dispenser forming a downwardly sloping surface, wherein each of the upper and lower guide plates defines an outer circumferential edge, and wherein the outer circumferential edges of the upper and lower guide plates are spaced from each other a distance selected to prevent selected varmints from reaching the dispenser.

21. The broadcast feeder of claim 20 wherein the lower guide plate is imperforate to the feed granules.

22. The broadcast feeder of claim 20 wherein the slope of the upper guide plate is greater than the slope of the lower guide plate.

23. A feeder assembly comprising the broadcast feeder of claim 14 and a feed hopper.

24. A broadcast feeder for dispensing granules of feed from a feed hopper, the feed hopper having a planar bottom having a bottom surface with a central opening therethrough, the feeder comprising:

a housing comprising:
- a planar attachment plate having an upper surface with a feed opening and being removably attachable to the bottom surface of the bottom of the feed hopper in face-to-face engagement therewith and so that the feed opening is alignable with the central opening in the bottom of the hopper;
- a chute depending from the attachment plate and configured to receive feed from the feed hopper;
- a dispenser rotatably supported in the housing and positioned to receive feed from the chute and to throw feed radially by centrifugal force when the dispenser rotates;
- wherein the housing further comprises an upper guide plate above the dispenser and a lower guide plate below the dispenser, wherein the lower guide plate is imperforate to the feed granules, wherein each of the upper and lower guide plates defines an outer circumferential edge that extends a distance beyond the dispenser, wherein each of the upper and lower guide plates is domed and forms a surface that slopes downwardly toward the circumferential edge, and wherein the outer circumferential edges of the upper and lower guide plates are spaced from each other a distance selected to prevent selected varmints from reaching the dispenser; and
- a motor supported in the housing and operatively connected to the dispenser to rotate the dispenser.

25. The broadcast feeder of claim 24 wherein the slope of the upper guide plate is greater than the slope of the lower guide plate.

26. The broadcast feeder of claim 25 wherein the dispenser has a bottom and wherein the circumferential edge of the upper guide plate is below the bottom of the dispenser.

27. The broadcast feeder of claim 26 wherein the dispenser comprises a tray and wherein the bottom of the dispenser is planar.

28. A feeder assembly comprising the broadcast feeder of claim 24 and a feed hopper.

29. The broadcast feeder of claim 24 wherein the chute is cylindrical.

30. A broadcast feeder for dispensing granules of feed from a feed hopper, the feed hopper having a planar bottom having a bottom surface with a central opening therethrough, the feeder comprising:
- a planar attachment plate having an upper surface with a feed opening and being removably attachable to the bottom surface of the bottom of the feed hopper in face-to-face engagement therewith and so that the feed opening is alignable with the central opening in the bottom of the hopper;
- a dispenser removably attachable to the attachment plate and rotatably supported to throw feed radially by centrifugal force when the dispenser rotates;
- a chute configured to receive feed from the feed hopper and to direct feed to the dispenser;
- upper guide plate above the dispenser and a lower guide plate below the dispenser, wherein the lower guide plate is imperforate to the feed granules, wherein each of the upper and lower guide plates is domed and extends a distance beyond the dispenser forming a downwardly sloping surface, wherein each of the upper and lower guide plates defines an outer circumferential edge, and wherein the outer circumferential edges of the upper and lower guide plates are spaced from each other a distance selected to prevent selected varmints from reaching the dispenser; and
- a motor operatively connected to the dispenser to rotate the dispenser.

31. The broadcast feeder of claim 30 further comprising a neck depending from the attachment plate and forming the chute, wherein the neck defines a slot, and wherein the feeder further comprises a chute control member configured for movement through the slot.

32. The broadcast feeder of claim 31 wherein the chute control member comprises an elongate plank that is movable radially in and out of the slot.

33. The broadcast feeder of 37 wherein the collar and neck are cylindrical and are threadedly connectable.

34. The broadcast feeder of claim 30 wherein the slope of the upper guide plate is greater than the slope of the lower guide plate.

35. A feeder assembly comprising the broadcast feeder of claim 30 and a feed hopper.

* * * * *